United States Patent [19]
Mason et al.

[11] 3,949,408
[45] Apr. 6, 1976

[54] MULTIPOINT GRAPH AND CHARACTER PRINT APPARATUS

[75] Inventors: Charles F. Mason; Merle C. Cox, both of Indianapolis, Ind.

[73] Assignee: Esterline Corporation, New York, N.Y.

[22] Filed: May 16, 1975

[21] Appl. No.: 578,090

[52] U.S. Cl. .................. 346/62; 346/34; 346/76 R
[51] Int. Cl.² ........................................... G01D 9/32
[58] Field of Search ..................... 346/76 R, 34, 62

[56] References Cited
UNITED STATES PATENTS
3,803,629  4/1974  Walsh et al. .................. 346/62 X
3,840,878  10/1974  Houston et al. ..................... 346/62

Primary Examiner—Joseph W. Hartary
Attorney, Agent, or Firm—Woodard, Weikart, Emhardt & Naughton

[57] ABSTRACT

Apparatus for providing an offset digital printout of numbers or characters on a multipoint chart recorder with thermal matrix printing. A print head is operable to mark a chart with analog value indications in the form of graphs and is also operable to print numbers and characters at selected positions on the chart. The alphanumeric indications designate particular plots on the chart paper, a time indication or preselected numerical representations.

13 Claims, 13 Drawing Figures

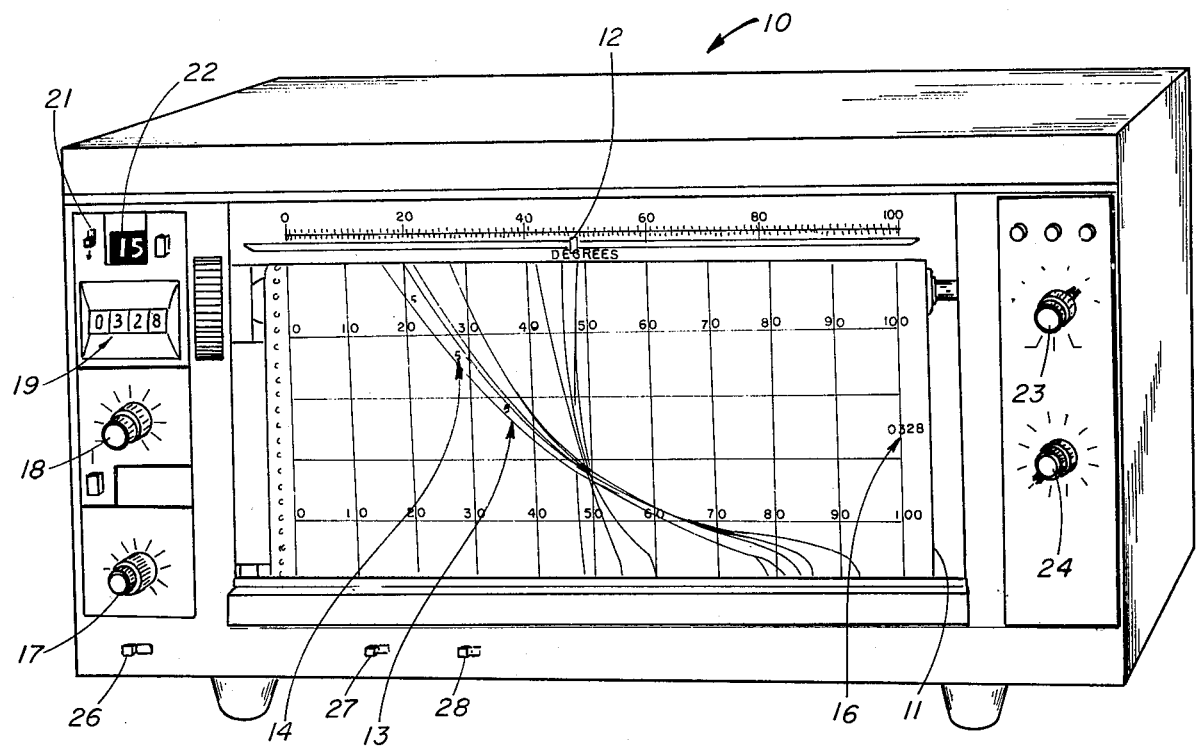
Fig. 1
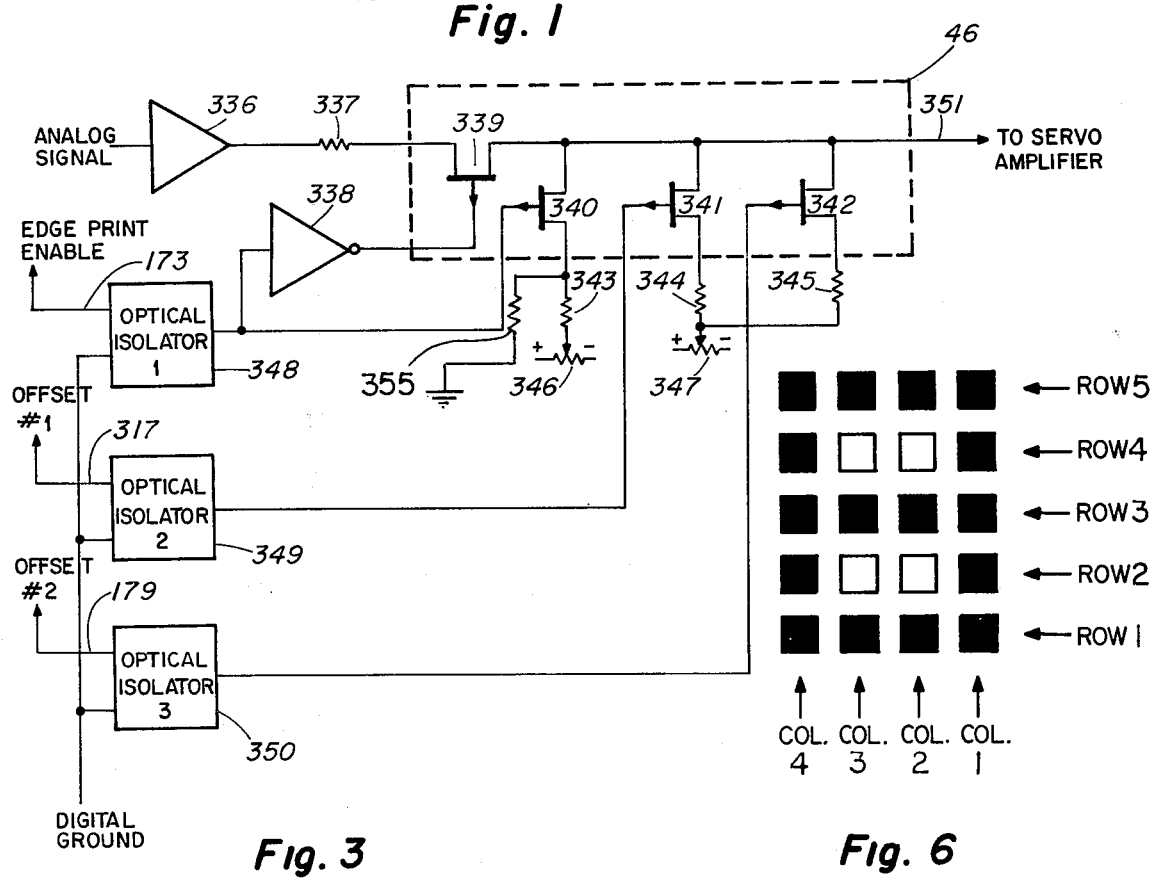
Fig. 3
Fig. 6

MULTIPOINT GRAPH AND CHARACTER PRINT APPARATUS

BACKGROUND OF THE INVENTION

1. Field of the Invention

This invention is in the field of chart recorders having a movable print head.

2. Description of the Prior Art

There have been proposed various fixed and moveable print head devices for producing graphs. Such chart recorders employ ink, heat, electrostatics and mechanical means for marking one or more graphs on a moving chart medium. Various of these recorders have introduced the concept of marking both the analog graph representations and alphanumeric symbols on the chart paper for various purposes.

For example, U.S. Pat. No. 3,754,279 to Valenti shows the use of a separate print head for recording data points on a chart, while a graph is recorded using a separate stylus. It is also possible to record digital information together with analog graph markings with a fixed print head, such as the thermal or electrostatic type. U.S. Pat. No. 3,394,383 to Lloyd and U.S. Pat. No. 3,815,144 to Aiken show chart recorder devices utilizing fixed rows of dots capable of providing alphanumeric information with the appropriate input. U.S. Pat. No. 3,840,878 to Houston shows a recorder which operates in one of two modes to record a graph and character on graph paper. The printing mechanism consists of individually energizable thermal printing elements in a thermal element matrix. While the Houston apparatus shows the marking of graphs with an identifying alphanumeric symbol, there is no indication in Houston of offset printing means for either multiple digit graph numbering or other special purpose offset alphanumeric symboling.

SUMMARY OF THE INVENTION

A graph printing apparatus comprising a chassis, a print head moveably mounted on the chassis and having an array of selectively activatable elements, a drive means for advancing a strip of markable recording medium past and adjacent to the array of elements of the print head, an activation means for selectively activating elements of the array to mark the advancing medium in response to marking commands, an analog means for positioning the print head along a direction transverse to the direction of advance of the medium in response to a data input to the apparatus, a means for generating an alpha-numeric character marking command and an alternative point marking command and for coupling one of said commands to the activation means, and offset means for positioning the print head a preset distance, along a direction transverse to the direction of advance of the medium, from a first position during printing of certain characters of multicharacter alpha-numeric markings on the strip of markable recording medium.

It is an object of the present invention to provide a graph printing apparatus operable to produce multiple character alpha-numeric symbols using a single moveable print head.

Further objects and advantages of the present invention shall be apparent from the following detailed description and accompanying figures.

BRIEF DESCRIPTION OF THE DRAWINGS

FIG. 1 is a perspective view of a chart recorder embodying the present invention.

FIG. 3 is a more detailed showing of the analog edge print block of FIG. 2.

FIG. 6 is a diagrammatic representation of the thermal print head of FIG. 2.

DESCRIPTION OF THE PREFERRED EMBODIMENT

Figure 2:
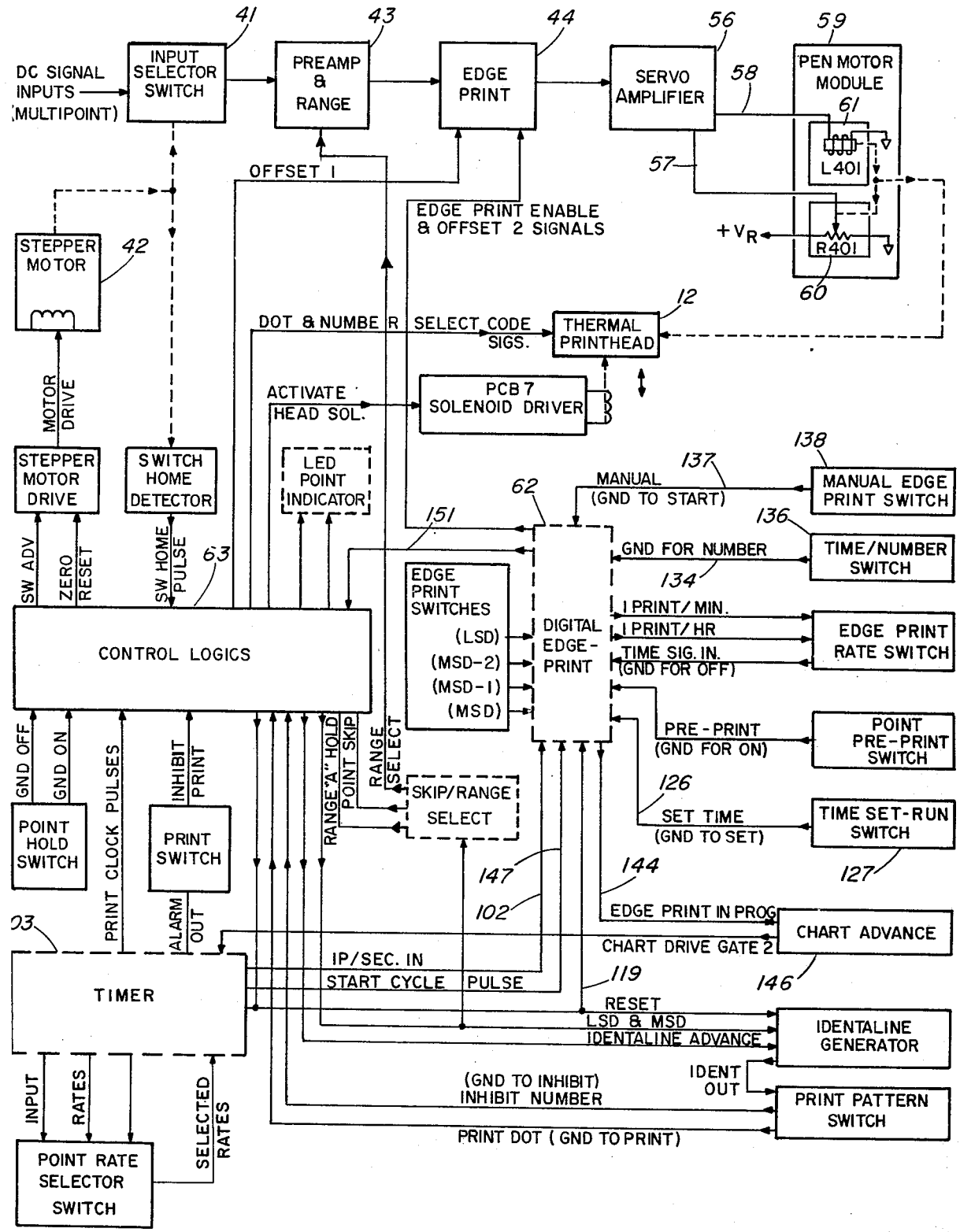
FIG. 2 is a simplified block diagram of the offset printing circuitry and related circuitry of the apparatus of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is shown a multipoint recorder with thermal matrix printing embodying the present invention. Recorder 10 has chart paper 11 advanced past thermal print head 12 at a selected speed. Print head 12 has an array of thermal heat dots as shown in FIG. 6 and chart paper 11 is a thermally sensitive paper. Print head 12 is moved along paper 11 in a manner to be described hereinafter and then activated to press against the chart paper at an appropriate location, whereupon the desired dots in the array of dots are activated to mark chart paper 11. Either a dot to provide graphic indications on the chart paper is activated or else a plurality of dots are activated to produce a desired alphanumeric symbol.

Multiplexed inputs to print head 12 are provided so that a plurality of graphs such as 13 are produced on chart paper 11. An alpha numeric symbol representative of a particular graph 13 such as symbols 14 may be produced at periodic intervals along the graph for identification purposes. In addition, the print head 12 may be energized, in a means to be described hereinafter, to produce a preset alphanumeric indication 16 at a desired position on the chart. This indication may also be an indication of time which has an initially preset value and progresses according to an internal timer in recorder apparatus 10. This printing operation shall be referred to herein as edge printing, but the position of the printing can be preset to any desired location across chart paper 11. A chart speed control 17 and print rate control 18 are provided as well as a settable dial 19 for programming the edge print number 16. Slide switch 21 is set to determine whether symbol 16 will remain at the selected input 19 or progress according to the internal clock.

The face of recorder apparatus 10 further includes a readout 22 of the graph being printed or tracked by print head 12 at a particular moment, an input selector span switch 23 and an offset selector switch 24. There is further included a main power switch 26, point hold slide switch 27 and point skip switch 28. Other indicators and controls shall be discussed hereinafter as necessary for an understanding of the embodiment of the present invention.

Referring now to FIG. 2, there is shown a simplified block diagram of the printing circuitry of chart recorder 10. There is a digital section for appropriately activating thermal print head 12 and an analog section for appropriately positioning print head 12. There is interaction between the digital section and the analog section when various edge print and offset print commands are executed. The items arranged generally above thermal print head 12 in FIG. 2 are essentially part of the analog control system, and those items below the thermal print head are essentially part of the digital control system. These sections comprise an analog servo-controlled measurement loop and digitally-controlled input selection/printing system.

The input selector switch 41, which is driven directly by the shaft of stepper motor 42, couples the appropriate DC input signal, of the 24 available channels, from the multiple-input panel at the rear of recorder 10 to the measuring circuit. The analog measuring system operates on a null-balance servo principle. The servo feedback signal is supplied by a precision potentiometer 60 which is automatically adjusted by movements of the pen-motor armature.

In the basic servo loop, the unknown input voltage is compared with an internal feedback voltage which is represented by the pen-motor armature positions; the difference or error signal thus developed is amplified and drives the pen-motor armature in a direction that causes the system to balance. The digitally-controlled thermal print head 12 records the channel of the measured analog signal on thermally sensitive chart paper in a dot pattern which forms the number of the selected input point. The print head is capable of forming only one digit of the alphanumeric symbols at a time; therefore, provision is made to print the second, and subsequent, digits of a multidigit number.

The signal of a channel from the input selector switch 41 is coupled to preamp and range circuitry 43. To minimize the adverse effects of interference that are normally prevalent in low level signals, the analog input is first preamplified at 43 before entering the comparison circuitry of the basic servo loop. The preamplified signal from circuitry 43 is coupled to an edge print board 44 (FIGS. 2 and 3). Edge print circuitry 44 performs two functions; (1) it provides a two position print circuit enabling most significant digit (MSD) of input points above 9 to be printed, and (2) it functions as a four position print circuit for a four digit edge print number.

The essence of the edge print circuitry is an integrated circuit quad bilateral signal-summing switch (generally represented as 4 J-FET's in 46) which comprises four separate C-MOS FET switches, hereafter referred to as FET's. Each switch has an in, out and control gate terminal and can be turned on individually by applying a positive voltage to its control.

In non edge print mode the analog signal is buffered in signal follower 336, and goes through resistor 337 and FET gate 339 to the servo amplifier. Since no Edge Print Enable signal is present on 173, and no offset signals are present, optical isolators 348, 349 and 350 are off. This shuts off FET gates 340, 341 and 342 and therefore the signal line 351 to the servo is unaffected by the signals on the far side of the gates. The low output of 348 goes through inverter 338 and turns on FET gate 339. This insures that this gate is open so the analog signals can go to the servo amplifier on 351. The optical isolators are used to insure proper isolation between the sensitive analog signals and the digital control signals. To print the second digit in the non edge print mode, a digital signal is applied to Offset No. 1 on line 317. This turns on the light emitting diode in optical isolator 349 and causes the output photo transistor to turn on. This places a high signal on FET gate 341. This adds a small offset voltage to 351 due to the resistor summing network of 344 and 337. This causes the print head to move a short distance to the left to allow the most significant digit to be printed. The spacing can be varied somewhat by adjusting potentiometer 347. When the offset signal at 317 is removed, the signal to the servo amplifier is returned to its normal valve. The signal activating this single digit offset is caused by driver 316 on FIG. 5d of the control logics.

When the time comes in the edge print cycle for the four digits to be printed, first an edge print enable signal is applied on 173 from the edge print board. The output of optical isolator 348 is inverted by 338 and this closes FET gate 339. This removes the analog signal from line 351 going to the servo amplifier and makes the edge print position independent of the input analog signal. When 348 is activated it also opens FET gate 340. This inserts a signal on line 351 proportional to the IR drop across resistor 355 developed by current from resistor 343 and potentiometer 346. The voltages and resistors are so chosen that the print head may be positioned any place across the chart by adjusting 346. This allows the "Edge Print" to actually be able to be printed anyplace across the active part of the chart.

The first character is printed at this point. Then a digital signal is placed on 317 and activates FET gate 341 causing additional current in 355 and changes the signal on 351. This offsets the print head to the left the same as for the most significant digit of the analog chart identification printing. The second digit is printed in this position. Next the offset No. 1 signal on 317 is removed and an offset No. 2 signal is applied to line 179 by the edge printing circuits. This activates optical isolator 350 and opens FET gate 342. This causes a larger offset to the left than Offset No. 1 and in fact is about twice as great since resistor 345 is about half the resistance of resistor 344. The third digit is printed in this position.

Next a signal is again applied to offset No. 1 line 317 and this again opens FET gate 341. Since now both FET gates 341 and 342 are open the currents through resistors 345 and 344 are added together in 355 causing a larger change in signal on 351 and the deflection to the left is 3 character spacings. The fourth digit is printed in this position. Next the Edge Print Enable signals and offset signals are removed from the inputs to the optical isolators and the signal to the servo amplifier 351 returns to the normal value determined by the analog signal amplifier.

The output of edge print module 44 is coupled to servo amplifier 56 which receives a position indicating signal from pen motor module 59 through line 57. Comparing this position with the desired position fed into servo amplifier 56, a correction signal is generated and exits on line 58 for head positioning pen motor 61 which positions the thermal print head at the appropriate position on the chart paper for the incoming channel. The operation of the digital circuitry shown in block form in FIG. 2 shall be discussed in conjunction with the detailed description of the control logics section and digital edge print section hereinafter.

Referring now to FIG. 4, there is shown a detailed circuit diagram of digital edge print circuit 62 of FIG. 2. Essentially, the circuitry of FIG. 4 comprises a digital multiplexer with edge print program logics for enabling the printing of an alphanumeric symbol or time symbol as generated by counter circuitry in the edge print section.

Line 102 (FIG. 4c) couples a one pulse per second signal from timer circuitry 103 (FIG. 2) to inverter 101. This signal is coupled to a divide-by-10 BCD decade counter Z21 such as a type 8280. The output of this divide-by-10 counter Z21 is coupled to the divide-by-6 portion of a divide-by-12 counter storage element Z26, such as a type 8288. The output of Z26 is a one pulse per minute signal which is available as an output at line 103. Line 103 is coupled to FIG. 4b as shown.

The one pulse per minute signal is also coupled to divide-by-10 element Z14, which produces at an output a one pulse per ten minute signal, which is coupled to the divide-by-6 portion of Z20 along line 104. Z14 and Z20 are the same types of integrated circuit as Z21 and Z26, respectively. The output of Z20's divide-by-6 portion is a one pulse per 60 minutes signal which is brought out on line 106 and runs to switch 107 (FIG. 4b) in the same vicinity as line 103. Output line 106 is also coupled to an input of Z25, which is also a type 8280 integrated circuit. The output of Z25 at line 108 is a one pulse per 10 hours signal which is coupled to the input of the divide-by-2 portion of Z26, whose output at line 109 is a one pulse per 20 hours signal. This output signal is coupled to the input of the divide-by-2 portion of Z20, whose output at line 111 would be a one pulse per 40 hours signal except for the reset function to be described hereinafter which limits the pulse to an occurrence on once per 24 hours.

The output on line 111 form Z20 is coupled to NAND gate 112, with the other input to NAND gate 112 on line 113 being from the output of Z25 which goes positive 4 hours after the output of Z20 goes positive. After 24 hours, both inputs to gate 112 are at a logic 1, causing its output to go to a logic 0, firing one shot multivibrator Z22 whose output is coupled to the inverter 114. The output of inverter 114 pulses low and the output of NAND gate 116 pulses high, with the output of inverter 117 pulsing low which resets Z21, Z26, Z14, Z20 and Z25. A reset operation may also be initiated through inverter 118 which is coupled by line 119 from the control logics circuitry 63 (FIG. 2).

Figure 4A:
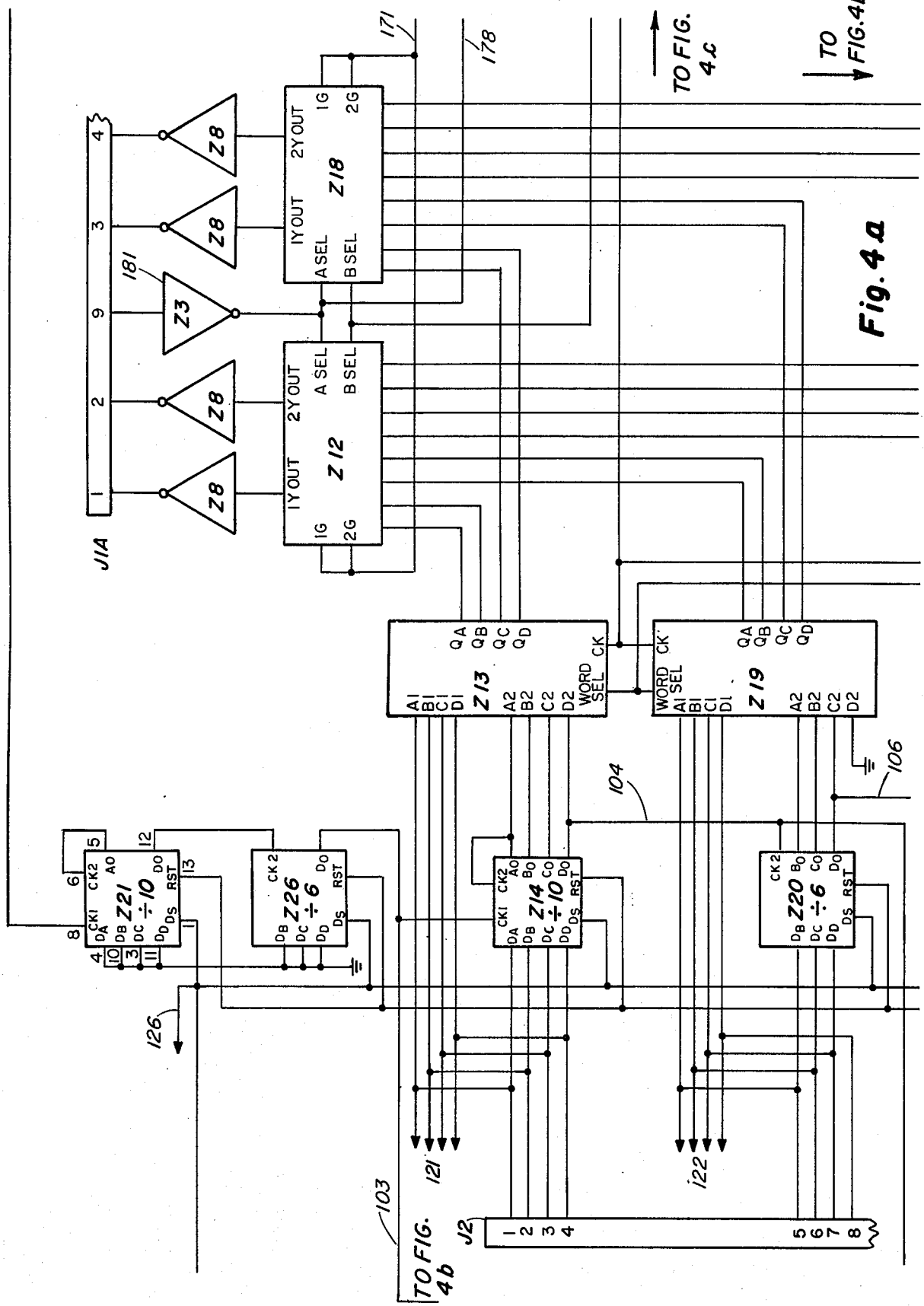
FIGS. 4a-c are a logic diagram of the digital edge print section of FIG. 2.
Figure 4B:
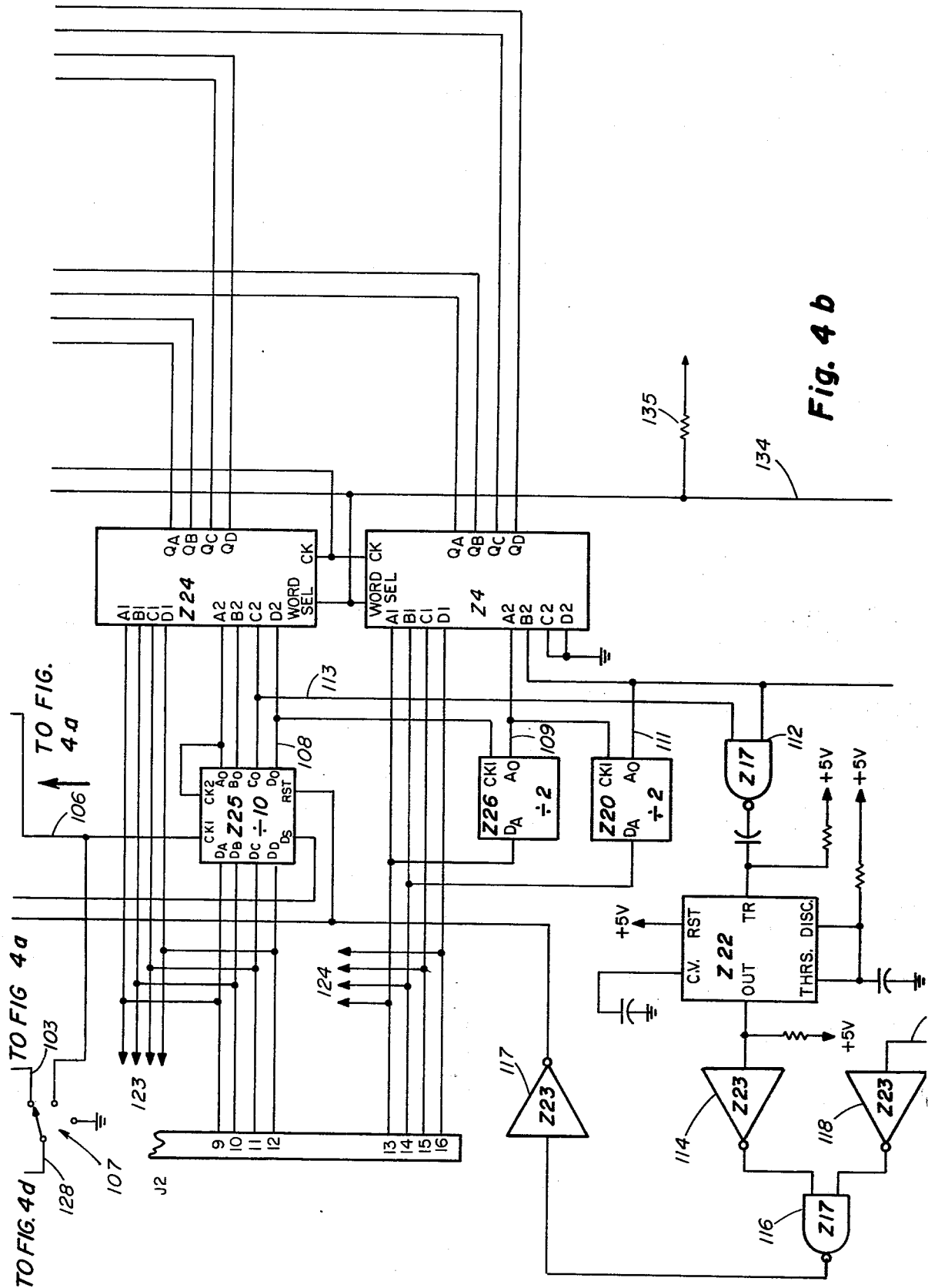
Figure 4C:
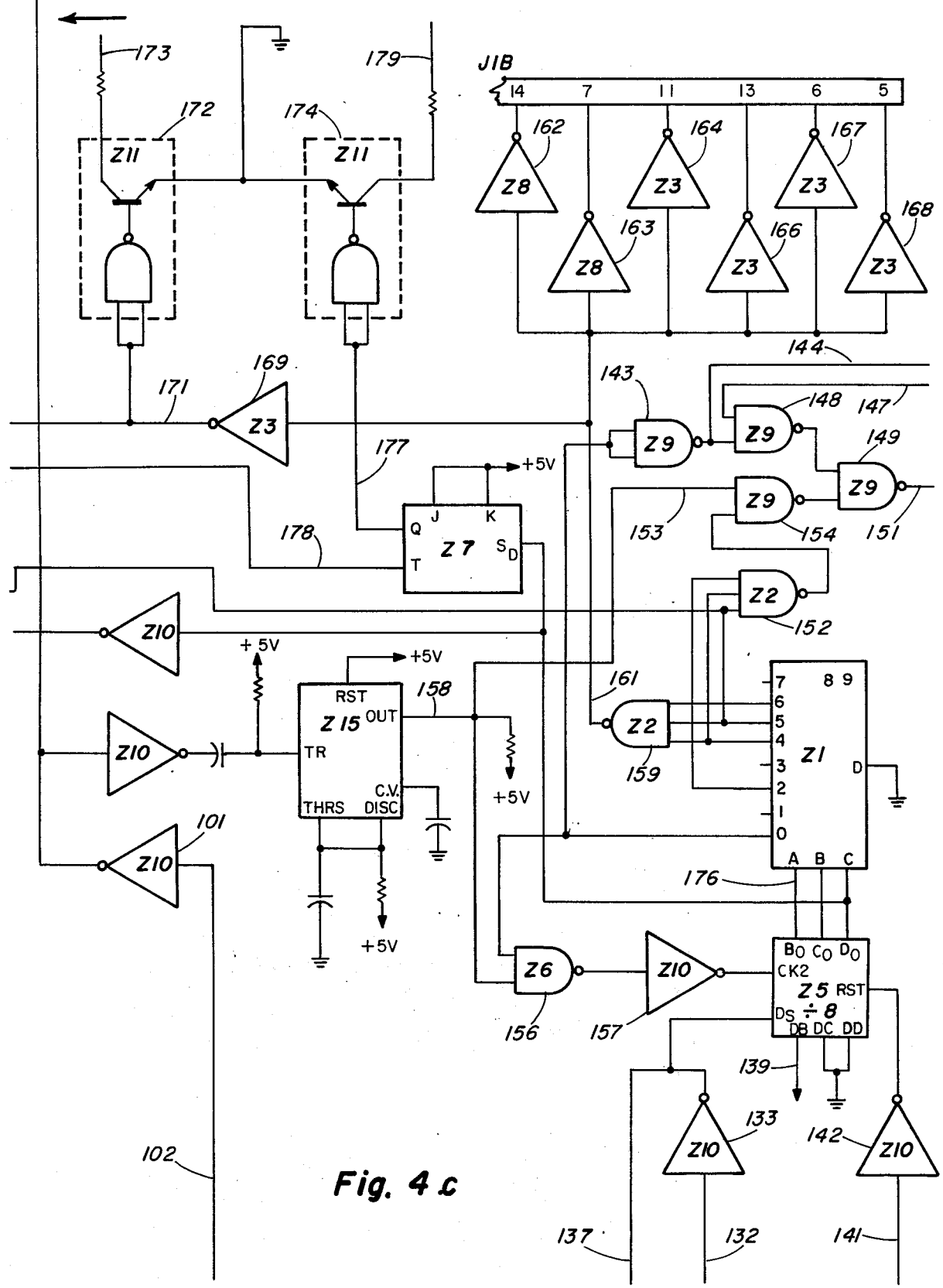
Figure 4D:
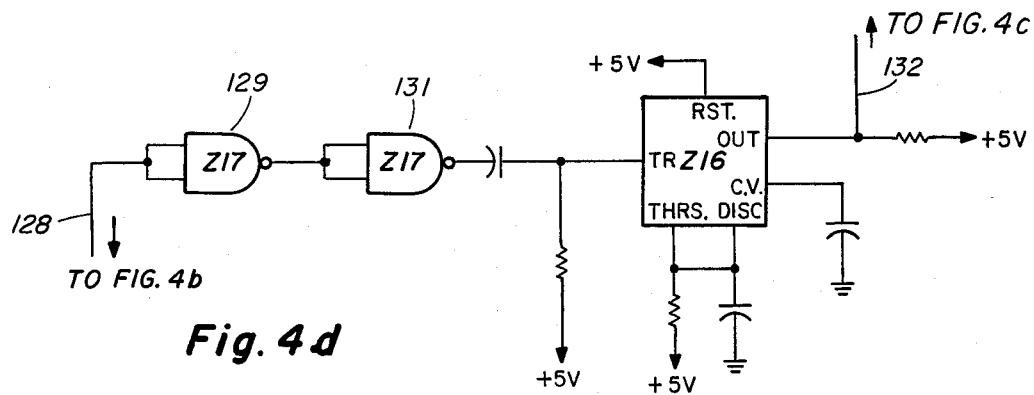

The connections in FIG. 4a and 4b generally indicated by reference numerals 121, 122, 123 and 124 represent connections to a plurality of pull-up resistors to maintain these lines at about +5 volts. The inputs to connector J2 are a plurality of two position switches (not shown) which program the presets of decade counter/storage elements Z14, Z20 and Z25 and the divide-by-2 stages of Z26. The preset inputs of Z21 and the divide-by-6 section of Z26 are tied to ground. This time preset information, to start the counters at a particular time on their first cycle is programmed into the counter/storage elements by grounding line 126 through a time set-run switch 127 (FIG. 2). The digits programmed through connector J2 and the grounded preset inputs of Z21 and Z26 are then impressed upon the storage sections of Z14, Z20, Z21, Z25 and Z26 to set the starting point for the first timer cycle. These preset values are impressed on the counter/storage elements only during the time line 126 is grounded and count in the normal way from this preset value when line 126 is ungrounded through the time set/run switch connected on line 126. The one pulse per minute or one pulse per hour or ground signals are coupled through a selector switch 107 (FIG. 4b) on line 128 to the circuitry shown in FIG. 4d. The selected timing input is buffered through NAND gates 129 and 131 and then one shot multivibrator Z16 and its associated signal-shaping circuitry produces at output line 132 a time signal pulse output to be utilized in the edge print cycle circuitry. Line 132 is coupled to inverter 133 as shown in FIG. 4c.

Returning now to FIGS. 4a and b, the programmed four digit number, which might represent a time to be programmed into the counter storage elements Z14, Z20, Z25 and the divide-by-2 section of Z26, is also coupled to one of the alternative sets of inputs of 4 bit data selectors/storage registers Z13, Z19, Z24 and Z4. These are a type 74L98 integrated circuit. The other groups of inputs to these elements are the instantaneous clock values from the counter circuits. A time/number select-switch 136 is coupled through line 134 (FIG. 2) and is operable to ground line 134 which grounds the selector terminal of Z13, Z19, Z24 and Z4. Pull-up resistor 135 causes this line to go high if 134 is ungrounded. Grounding this terminal selects the four digit number appearing at inputs A1, B1, C1 and D1 of each register for clocking into the output registers A, B, C and D. In this fashion, the four digit number which is printed upon the activation of the circuitry to be described hereinafter is the preset four digit number as shown at 19 in FIG. 1. If a logic 1 is received on line 14 (line 134 is ungrounded), then the instantaneous value of the clock count from the outputs of the time counter registers is selected to be clocked into the output registers A, B, C and D.

Referring now to the edge print initiation and cycling circuitry (FIG. 4c), either a manual edge print start signal pulse on line 137 or one from the timing signal output on line 132 is coupled to counter-storage element Z5 which is a type 8281. Z5 functions as a 3-bit binary counter/storage element connected in a divide-by-8 mode. It is initially reset on turn on to the 0 count state by a signal on line 141 which is inverted by 142 and applied to the reset input of Z5. Output 0 of Z1 is then made low which closes NAND gate 156 and prevents clock pulses 158 from going through 156 and 157 and advancing counter Z5. Z5 thus stays in the 0 count state. Line 137 (FIGS. 4c and 2) is coupled from a manual edge print switch 138 (FIG. 2). As shown in FIG. 4c, line 137 is connected directly to the preset gate enable input of Z5. The logicl level pulses received on line 132 are inverted by inverter 133 and present a logic 0 to the preset gate enable input of Z5 if an edge print command is initiated. Line 139 from Z5 is coupled to +5 volts while DC and DD are connected to ground to maintain the DD, DC and DB preset inputs of Z5 at a logic 0-0-1 level respectively. When a logic 0 is received at the $D_S$ input of Z5 to initiate an edge print operation, Z5 is preset to the 1 count state. When output 1 of Z1 becomes a 0, the output 0 of Z1 becomes a 1 and allows the clock pulses on 158 to go through 156 and 157 to clock Z5 so that it continues to advance in count from the preset point.

Z1 is a BCD-to-decimal decoder such as a type 7442. Z1 receives BCD count from the outputs of Z5, and with the initiation of one count, the signal on output 0 0280 of Z1 becomes a 1 and is coupled to NAND gate 143, whose logic 0 output is coupled on line 144 to the timer circuitry 103 (FIG. 2) indicating edge print in progress through the chart-advance inhibit switch 146. Line 147 (FIGS. 2 and 4c) contains a start cycle pulse from the timer circuitry 103 which is coupled to an input of NAND gate 148 (FIG. 4c). Under non-edge print conditions NAND gate 148 and 149 conduct the positive point rate pulses coming from the timer board on line 147 to the line 151. Line 151 couples this start cycle pulse to the control logic circuitry 63 to initiate a print cycle. When an edge print is initiated the 0 output of Z1 becomes high and this signal is inverted by 143 to make 144 a 0 level. This stops any pulses coming on 147 from getting to 149 and thus stops the normal point advance of the instrument.

When Z1 is preset, the outputs of Z1 change with the 0 level moving from the 0 output to the 1 output. Since the 1 output is not connected, this provides a delay and after another second, the 0 level moves to the 2 output of Z1. When the 2 output of Z1 goes to 0, the input to NAND gate 152 goes low causing its output to go high; however, the timing pulse on line 153 from one shot multivibrator Z15 has already passed. Therefore, the output of NAND gate 154 remains high and NAND gate 149 is not affected. Therefore, a print command is not generated on line 151.

At the same time, the timing pulses at one pulse per second through line 102 are coupled through one shot multivibrator Z15 to produce shaped timing pulses which are fed to NAND gate 156. These pulses are inverted by inverter 157 and coupled to a clock input of Z5. These are the pulses which are counted by Z5 in the divide-by-8 mode, after Z5 has been activated by preset gate signals through lines 137 or 132.

Also just previous to the time that the 0 level of Z1 moves to the 3 output, the timing pulse from the output line 158 of one shot multivibrator Z15 coincides with the logic 1 caused by the 0 count at one input to NAND gate 152 and inverted to a 1 by NAND gate 152 to become the other input to NAND gate 154. Both of these inputs go to a logic 1 for the duration of the pulse on 158, producing a 0 pulse at the output of NAND gate 154 and a logic 1 pulse on line 151 to initiate a print cycle. This command to initiate a print cycle by the edge print circuitry enables the recorder apparatus to print the data point or number which it normally would print before the initiation of the actual edge printing.

Once the 0 level reaches the three count on Z1, another pause is observed to enable the print cycle to be completed before initiating edge print. When the 0 level reaches the 4 count on Z1, a low input is again placed on NAND gate 152 returning its output high once again. At the same time, the first of three low inputs is provided to NAND gate 159 whose output stays at a logic 1 for three counts. The high output on line 161 from NAND gate 159 is processed through inverters 162, 163, 164, 166, 167 and 168. These inverter outputs are coupled to the control logic circuitry, as shall be described more particularly hereinafter. These outputs serve to inhibit graph printing and enable the alphanumeric edge printing. The logic 1 output on line 161 is also coupled to inverter 169. The logic 0 output on line 171 from inverter 169 is coupled to dual four line to one line data selector/multiplexer units Z12 and Z18, which are integrated circuit types 74153. This 0 level on line 171 also activates Z11 to activate edge print enable LED in the analog circuit. Z11 is a type 75451A dual peripheral driver, and Section 172 of Z11 is activated from line 171. Output line 173 from Section 172 of Z11 is coupled to optical isolator 348 in the analog edge print section (FIG. 3).

The 0 level at the output of inverter 169 also activates the multiplexers Z12 and Z18 to select one of the four digits to be printed. With the count at 4, at Z1, the BCD numeral 4 line 176 from Z5 to Z1 is high and it is coupled to flip-flop Z7. On Z7, line 177 is held high by a low on the input from line 176 of Z1 during the time that Z1 is decoding counts 0, 1, 2 and 3. This keeps the major offset optical coupler deenergized so no major offset occurs to the print head. The low on this input to Z7 also means that the input counts occurring on line 178 of Z7 due to the point printing operation do not affect the offset (line 177). At count 4 on Z5, when line 176 goes high, this allows the flip-flop Z7 to start to count. Line 177 of Z7 goes to a 0 as soon as the second digit of the edge print operation is finished printing (due to count signals on pin T of Z7). This inserts the major offset until the last two digits of the edge print are finished printing. At the finish of the fourth digit being printed, (another count signal on lines 178 to Z7) line 177 of Z7 immediately goes high. The low on line 176 of Z5 at the completion of the edge print operation insures that line 177 of Z7 remains high. Thus, the major offset cannot occur except during a portion of the second half of the edge print cycle. Line 177 activates portion 174 of Z11 to provide the major offset signal on line 179. Line 179 is shown entering optical isolator 350 in FIG. 3.

On the count of 5 at Z1, the B selector inputs of Z12 and Z18 are activated calling out the top two digits of the edge print as contained in Z13 and Z19. The signal received from the second digit reset through pin 9 of J1A is a level received when the second digit of a group of two digits is to be printed and this signal is coupled through inverter 181 to line 178 to Z7.

When the 0 count moves to the 6 output of Z1, the print cycle through NAND gates 152, 154 and 149 and line 151 is terminated while the low count is still coupled through NAND 159. Thus, even though the commands to the numbers to be printed have ceased, the edge print cycle has another second of pause to complete the printing operation. The low output then moves to the 7 count of Z1 for another pause and then back to count 0. When Z5 contains the count 0 it causes a low to be placed on one input of NAND 156 causing the output of NAND gate 156 to go high regardless of pulses from Z15. This stops the operation of Z5 until a subsequent activation signal is received through lines 132 or 137.

Referring now to FIG. 5, the control logic section 63 of the recorder apparatus, and its interaction with the digital edge print circuitry and analog section, shall be described in detail. Outputs 1, 2, 3 and 4 (corresponding to those lines on connector J1A in FIG. 4) are coupled to inverters 201 through 204. The outputs of these inverters are connected to seven segment decoder Z4' and are coupled through NAND gates 205 through 213, 301 and inverters 302 to produce the appropriate inputs for column driver Z9' for printing the numbers provided from edge print socket 62. In order to energize the appropriate dots on the thermal print head, four-line to ten-line decoder Z25' sequentially energizes its outputs 3 through 7 which are coupled through inverters 214 through 218 to row driver Z11'. As each of the output lines of Z25' is energized, the appropriate connections are made through inverters and NAND gates 219 through 225 and 301 and 302 to coordinate with the outputs from seven segment decoder Z4' to energize the appropriate dots in the matrix as shown in FIG. 6 to print the digit indicated from outputs 1 through 4 of connector 62.

A start cycle pulse from line 151 is coupled through inverter 226 from the edge print circuitry as shown in FIG. 4c. This is the pulse which initiates a print cycle. Clock pulses are received on line 227 (FIG. 5d) from the timer board and buffered through inverters 228 and 229 to NAND gate 231. The clock pulses are also coupled along line 233 to NAND gate 234. The other input to NAND gate 234 from four-line to ten-line decoder Z25' is normally at a logic 0 unless a print cycle has been initiated. With this input of line 236 to NAND gate 234 low, its output remains high and provides a high input to NAND gate 237. Line 238 from the output of NAND gate 239 is normally high unless a second digit is to be printed, as shall be discussed more particularly hereinafter. Therefore, there are normally three high inputs to NAND gate 237 and its output is low. When a start cycle pulse is coupled through inverter 226 one input to NAND gate 237 sets a 0 pulse and a 1 pulse occurs on its output. This output is received by Z26' which advances to a 1 count. This is coupled to decoder Z25'. This causes line 236 to go to a logic 1 and the clock pulses coupled through the other input to NAND gate 234 are fed through NAND gate 237 into Z26'.

The clock pulses are counted by Z26' and decoded into 10 lines by Z25'. When the 2 output of Z25' goes low, the output is coupled through inverter 241 to NAND gate 242 for Identaline a trademark of the assignee of the present application advance, as shall be described hereinafter. The 3, 4, 5, 6 and 7 counts are used to privide the row activation for the thermal print head. In addition, as each of the outputs from 3 through 7 of Z25' is low the output of NAND gate 243 is high. Input line 244 to NAND gate 246 is normally high, being coupled from the normally high input line 247 from the inhibit print switch. Thus, during the 3, 4, 5, 6 and 7 count at Z25', when one of these outputs is low, the output of NAND 243 is high, the output of NAND 246 is low and line 249 is high due to inverter 248. Output line 249 from the inverter 248 is coupled to the head pulling solenoid associated with thermal print head and pulls it in hard against the paper during the print cycle.

During the 1 through 8 counts of Z26', the 0 and 9 outputs of Z25' are high. Since line 247 is high, if printing is desired all three inputs to 262 are high and its output is low. The output of 263 is then high and this goes to the head pulling solenoid to pull the head down against the paper for printing. Inhibit print line 247 is grounded to prevent the recorder from printing.

A ground on 247 causes a 0 on NAND 224 which causes a continuous 1 on the output of NAND 224 no matter what the other inputs of 224 would be. A ground on 247 causes a 1 on the output of NAND 252 and a 0 on the output of inverter 303. This output goes to an inhibit input of the 7 segment decoder 304 which inhibits its output. Grounding 247 also causes the output of 246 to go high and thus the output of inverter 248 to go low. This inhibits the head-pulling solenoid from pulling in hard against the paper. Grounding 247 also causes NAND 262 to go high and line 264 to go low (provided the other input to 263 is in its normally high state). This prevents the solenoid from pulling the print head against the paper.

Line 251 is grounded to inhibit the printing of a number but not inhibit the printing of a dot or the activation of the head pulling solenoid. Grounding 251 causes the output at 252 to go high and thus the output of 303 to go low. This inhibits the number encoder 304.

When an 8 count is reached on Z25', the output of 253 goes high and allows a clock pulse on 233 to go through NAND 254 if a second digit is to be printed as determined by 305 being high. If 305 is high, a single clock pulse is sent through 254 and 256 to flip flop 306 which changes state. The $\overline{Q}$ output of 306 then goes high and allows clock pulses 233 to start feeding through 307 and through inverter 308 into counter 309 which is a 4 stage binary counter.

Counter 309, which had initially been reset to the 0 count, then starts to count clock pulses. This counting time is used as a delay to give time for the recorder to move to the offset print position. When counter 309 reaches a 15 count, NAND gate 239 allows a clock pulse to go through to line 238. This pulse through NAND 237 and triggers a second print cycle by feeding a clock pulse into 310.

When $\overline{Q}$ of 306 goes high, showing that the second digit is being printed, the output of 311 goes low. This causes the output of 224 to go high and inhibits the printing of a dot in the second number. The high output $\overline{Q}$ of 306 also causes the output of 312 to go low. This deactivates NAND gates 293, 295, 297, and 198. Output Q of 306 goes low when $\overline{Q}$ of 306 goes high. This signal is fed through inverter 313 to cause a high. This activates gates 294 and 296 and selects the most significant digit information from counters 291 and 292 to be sent through inverters 201, 202, 203 and 204 to 7 segment decoder 304. This causes the most significant digit to be printed.

When the Q output of 306 goes low showing that a second digit is to be printed, gate 242 (FIG. 5c) is disabled and this prevents clock pulses 233 from going through inverter 314 and advancing the "Identaline" counter with pulses on line 315.

A low on the Q output of 306 also deactivates NAND gate 258 and prevents clock pulses 233 from going through NAND 259 and pulsing line 261 which goes to the stepper drive which advances the stepper switch controlling the input point selector switch.

A low or Q also activates driver 316. This causes the optical coupler controlling offset No. 1 (FIG. 3) to be activated when line 317 goes low. A small analog offset is thus inserted in the analog amplifier to cause the print head to move one character spacing to the left. The time delay generated by 309 allows time for this offset to takeplace. This offset is maintained during the prining of the second digit. When the second digit has been printed, output 8 of Z25' again goes negative; the output of 253 goes positive and another clock pulse is fed through 254 and 256 to 306. This causes the $\overline{Q}$ output of 306 to go negative which stops the counts into counter 309 and returns the gates to select the least significant digit from the counter. When $\overline{Q}$ of 306 goes negative, the Q of 306 goes positive. This deactivates driver 316 and turns off the optical isolator controlling offset No. 1, thus removing the analog offset from the analog deflection amplifier and returning the recorder to the normal position.

During the normal operation of the recorder, the print rate is determined by a pulse generator on a timing card. The rate is selected by front panel switches which select the desired output from a counter chain which counts down from line frequency to give accurate timing pulses. Various counter arrangements are utilized to give a pulse every 1, 2, 5, 10, 20, 30 seconds or 1 or 2 minutes. The point rate may be advanced manually; that is, one point every time a push button is pressed and released. Also a continuously variable point rate between 1½ and 30 seconds per point is provided. This rate is generated by a pulse generator whose frequency is controlled by a potentiometer on the front panel. These signals which are generated on the timer board are selected and controlled by front panel switches and the output fed into a pulse generator, which generates the start cycle pulse 147 shown in FIG. 2 and FIG. 4c. The timer board is also used to generate pulses which are fed to another stepper driver circuit which drives the paper advance mechanism. Front panel switches select various pulse rates to drive the chart from 0.25 inches per hour to 8 inches per minute.

In normal operation the point is advanced immediately after a given point has been printed. When output 9 of Z25' shown in FIG. 5a goes to 0 after the printing cycle, it is inverted by 257 to put a 1 on 352. This allows clock pulses 233 to go through 258 provided the other two inputs to 258 are 1. Line 318 will be a 1 unless a second digit is to be printed as determined by a 0 on Q of 306. In this case line 318 will return to a 1 after the second digit has been printed and allow the pulse to get through gate 258. Line 319 will be a 1 if the recorder is to advance to the next point. Line 319 will be a 0 only if the unit is in the "point hold" condition, which is determined by the toggle made up of 320 and 321 and whose state is determined by a switch on the front of the recorder controlling lines 322 and 323.

When a clock pulse goes through 258 it is inverted and goes through 259 to line 261. This goes out to the stepper motor drive controlling the input selector switch and advances it one step or one-half the distance to the next point. A pulse on 261 also clocks flip flop 324 to make Q of 324 a 0. This is inverted by gate 271 to make 325 a 1. This allows the next clock pulse on 233 to go through 231 and 259 to apply a second pulse to 261 to advance the stepper motor controlling the input switch. This completes the input switch advance to the next point. The second pulse on 261 also clocks 324 again which causes the Q output to go to a 1 and the output of 271 to go to a 0. This 0 on 325 prevents more clock pulses on 233 from going through 231. The Q̄ output of 324 is sent to a BCD counter comprising 326, 291 and 292. Since two clock pulses on 261 into 324 cause one count into counter 326, the BCD counter is advanced one count each time the input stepping switch advances to the next point.

Figure 5F:
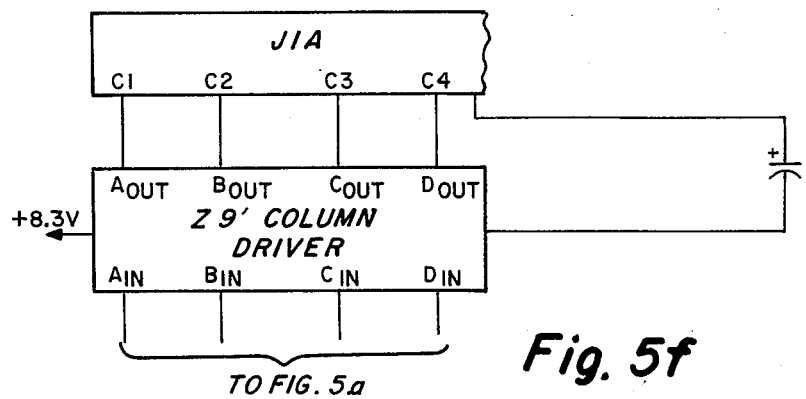
FIGS. 5a-f are a logic diagram of the control logics portion of FIG. 2.
Figure 5B:
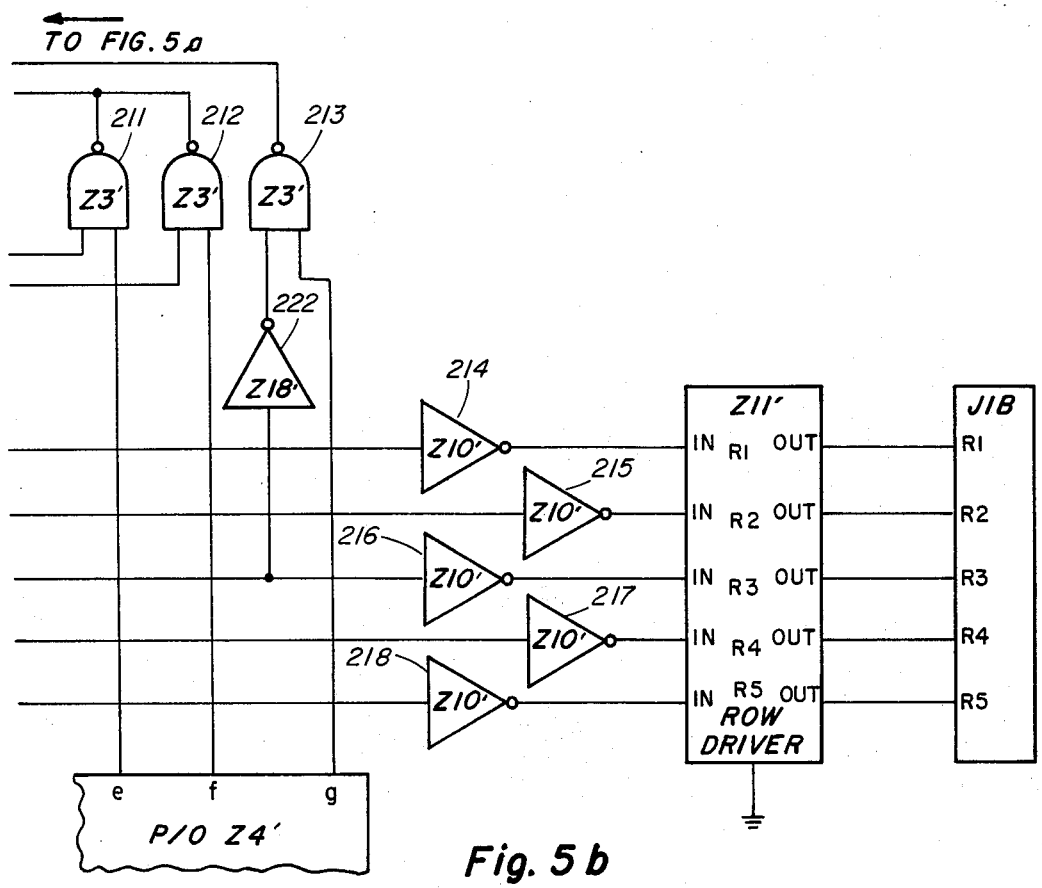
Figure 5A:
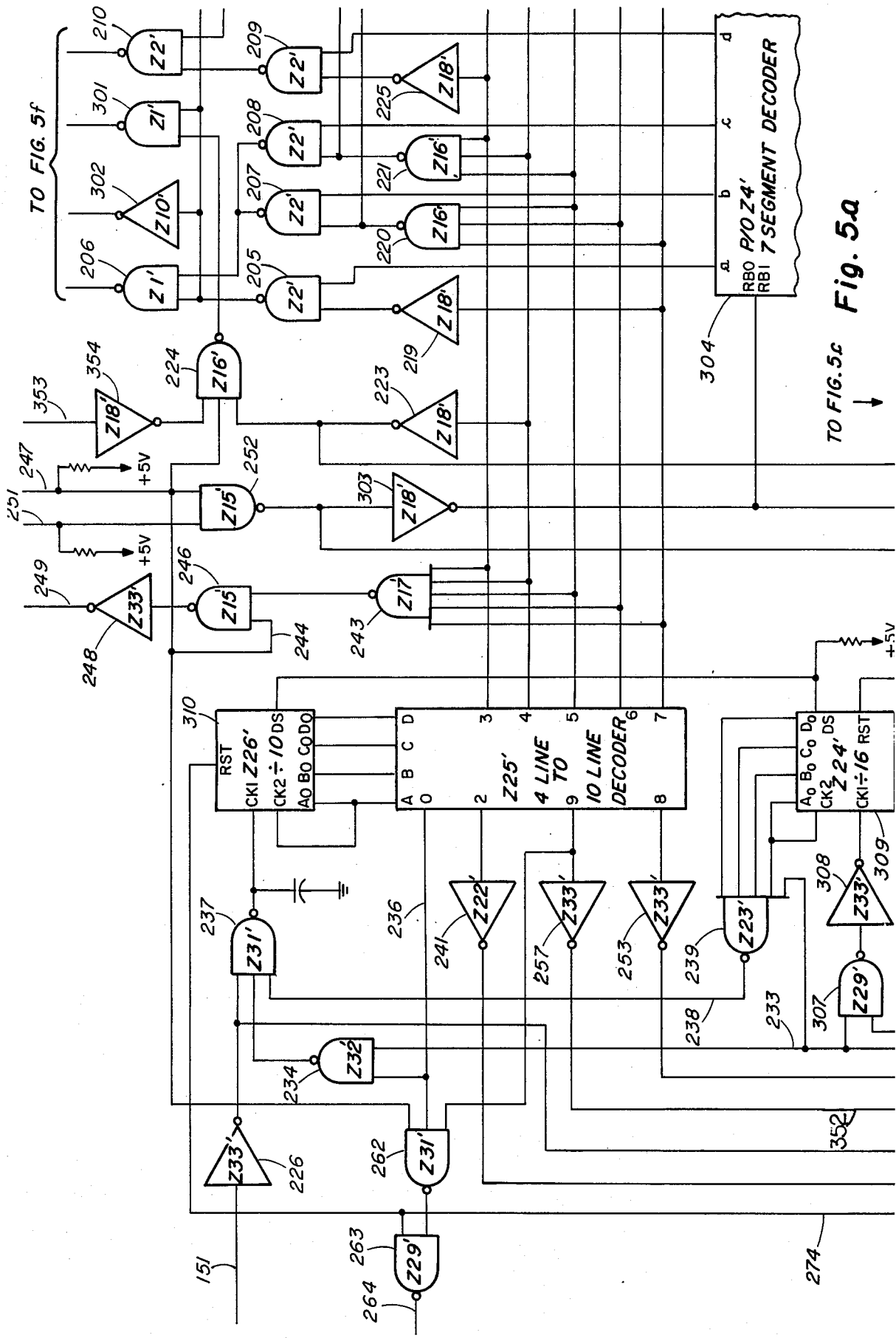
Figure 5C:
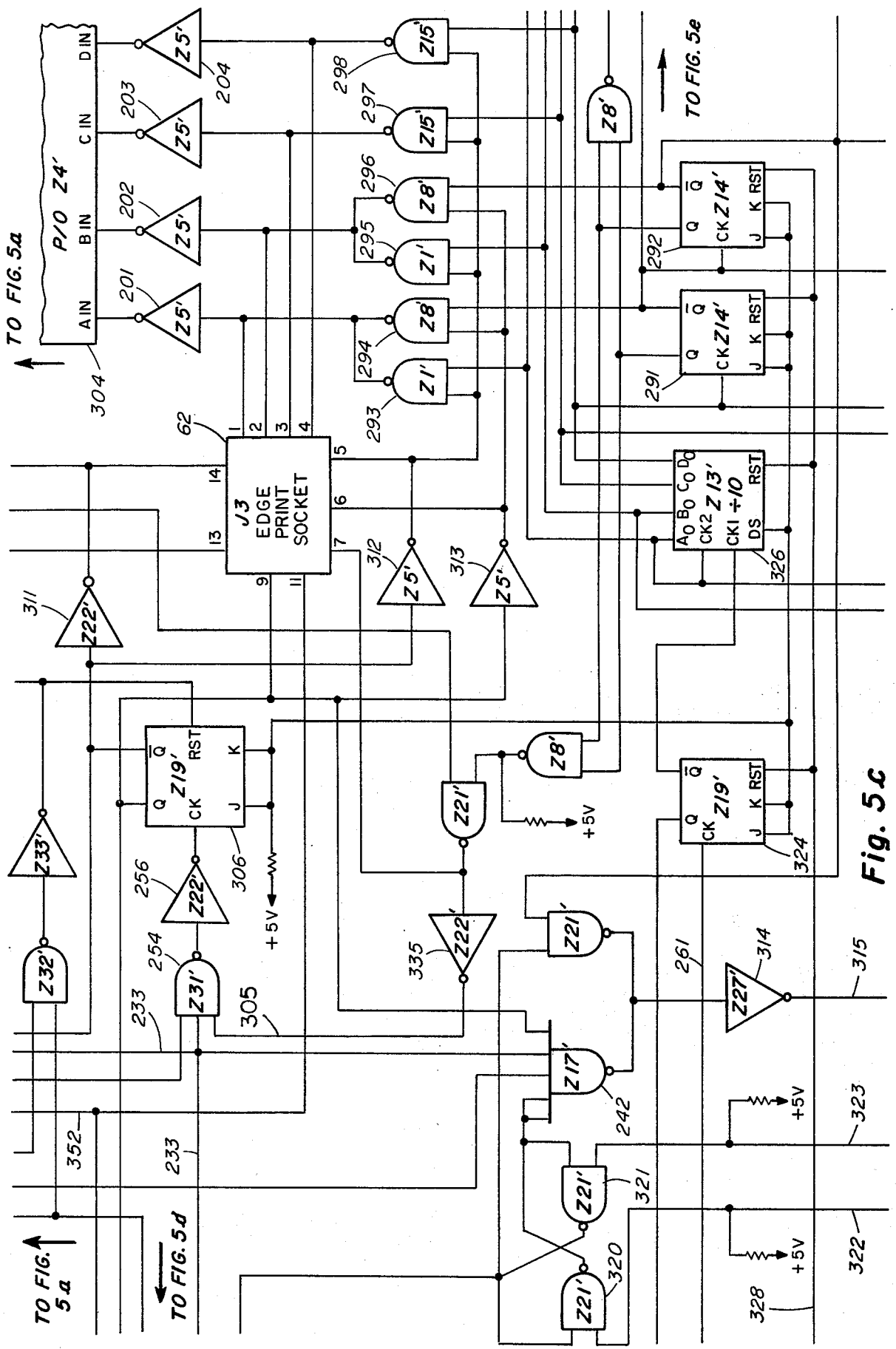
Figure 5D:
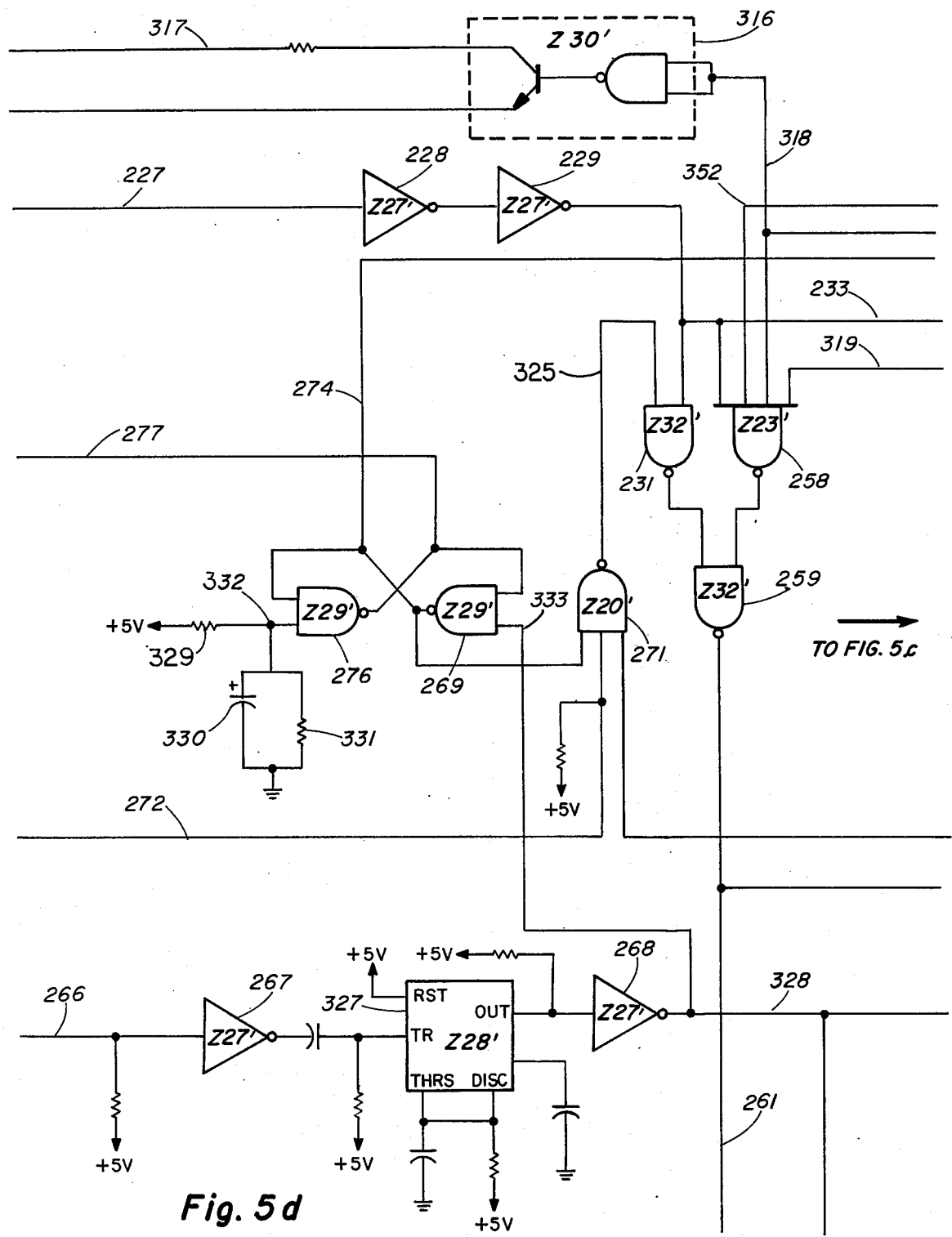
Figure 5E:
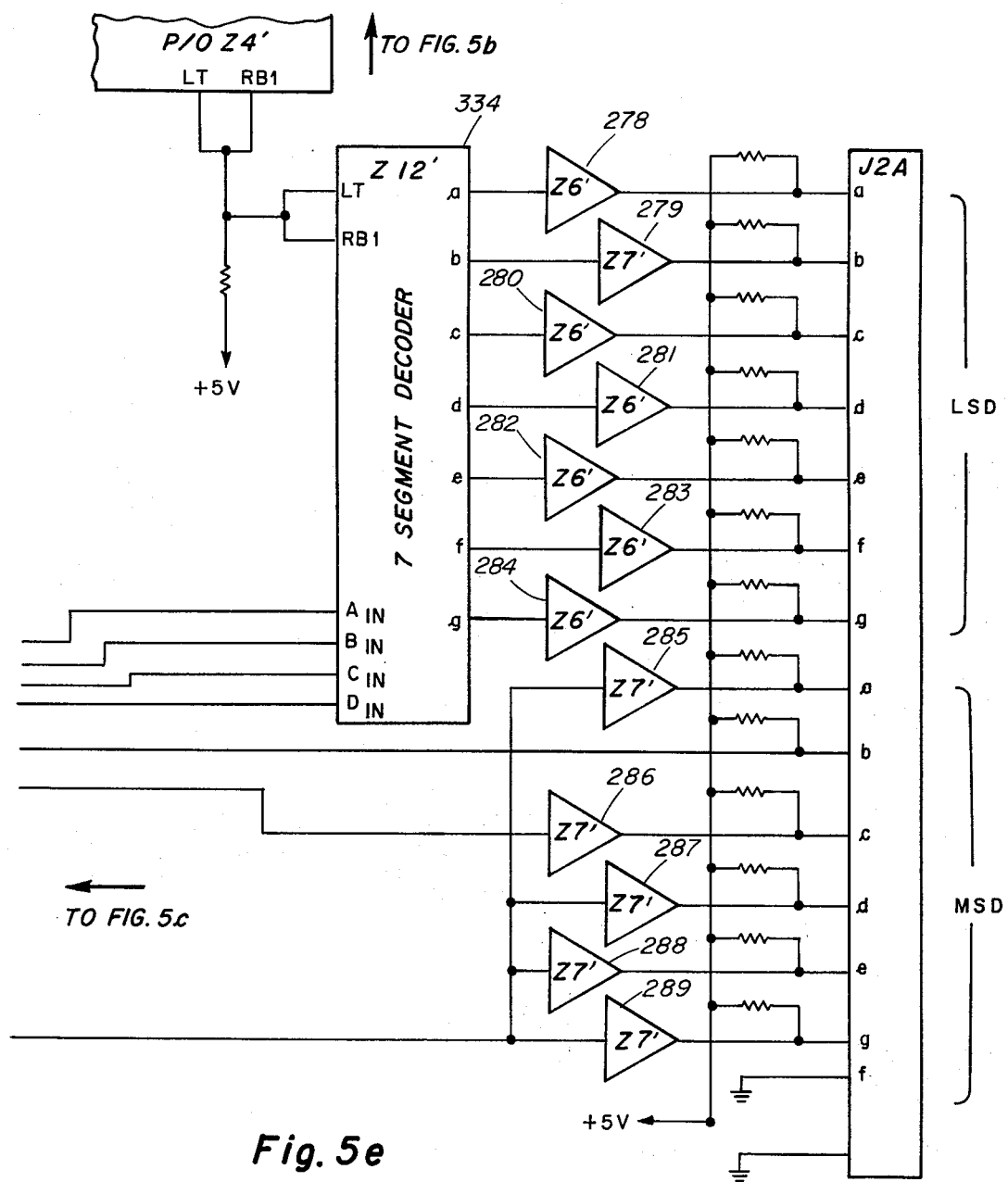

The above counting process is repeated until a count of 23 is reached. The next 2 pulses sent to the input stepping switch advance it to the zero or original data point input position again. An opaque disk with a single slot is mounted concentric with the input rotor selector switch. By means of the disk and a light-emitting diode and photo detector combination, the zero of "Home" position of the switch is detected and a signal sent on line 266 (FIG. 5d). This is turned into a pulse by pulse generator 327 and inverted by 268 to give a reset pulse on 328. This resets the point counter 326, 291 and 292 and also 324 if it happened to get out of phase in some manner.

NAND gates 276 and 269, as well as capacitor 330 and resistors 329 and 331, make up a turn-on reset circuit. This insures that all circuits are in the proper starting state when the instrument is turned on. When first turned on 332 is at ground due to capacitor 330 having discharged through 331, and 333 is in its normally-high state. This causes the toggle made up of 276 and 269 to give 1 on 277 and a 0 on 274. After a period of time capacitor 330 charges up through resistor 329 until 332 is at a logic 1 position. A 0 on 274 causes a 1 on the output of 271 on line 325. This allows clock pulses to go through 231 which then go through 259 to send pulses out on 261 to the input switch stepper motor. The switch continues to rotate until a pulse from the photo detector occurs on 266. This generates a 0 pulse on 333 by means of 267, 327 and 268. The pulse on 333 changes the toggle 276 and 269 and immediately stops the switch in the HOME position and with the counters 326, 291 and 292 reset to zero count. During the reset time the head-pulling solenoid is activated by a low on 274 going to 263 and making 264 high. Counter 310 is also reset as well as 309 and 306.

Line 272 is used to skip points for program printing. The points that is is desired to skip are programmed by switches into the logics of the program skip board. The output of the point counter 326, 291 and 292 is fed to this board. Then the point count register reaches a point that is programmed to be skipped, line 272 is brought to a 0. This makes 325 high and allows clock pulses 233 to go through 321 and 259 to 261. This advances the input stepper and also the point counter 326, 291 and 292. The point skip logics keep the line 272 low until a point number is reached which the skip programming shows was not to be skipped. Line 272 is immediately made a 1 and input selector switch and counter advance are stopped.

The output of the point counter decoded by the logic circuit and display drivers consisting of 278 through 289 and 334 is coupled to a dual 7 segment numeral display. This gives a visual display of the point being monitored. This display is located on the front panel of the instrument.

In order to edge print it is necessary to disable the point printing operation and substitute the edge printing operation. The stopping of the normal start print pulses coming on 151 and the substitution of the edge print pulses has been covered previously. Much of the remaining digital control to accomplish this is done by the signals coming in to 62 from the edge print circuit. During the time that the numbers from the point counter are to be printed, that is under nonedge print conditions, lines 1 through 7, 11, 13 and 14 of socket 62 are at 1 condition so far as the edge print circuits are concerned. However, these circuits, as well as the ones to which these lines connect on the control logics shown in FIG. 5, are of a type which permits the wired OR connection on their output. During the time that the four digits for edge print are being printed, the lines 1, 2, 3, and 4 of socket 62 on FIG. 5c contain the binary information determining what number is to be printed by the print head.

Lines 5 and 6 of 62 are grounded during the printing time of the edge print information. This insures that the outputs of 293 through 298 are high, to allow for the wired OR of data from the edge print circuit on lines 1, 2, 3, and 4 of 62. During the time of the printing of the edge print information, line 7 is also grounded. This insures that the output of inverter 335 will be high and that gate 254 will allow pulses to go through at the proper time to always print a second digit no matter what the point counters 326, 291 and 292 are storing. Line 11 of 62 is also grounded during the actual edge printing. This grounds the 352 line into NAND 258 and insures that no point advance signals are sent to 261. During the edge print operation 13 on socket 62 is grounded. This insures that the output of 303 will be a 1 and thus allow 7 segment decoder 304 to be active no matter what the condition of lines 251 and 247 going into 252. During edge print line 14 of 62 is grounded. This places a 0 on the input to NAND 224 and ensures that no point markings are printed in the edge print numbers. Line 9 of 62 carries the information of the state of flip flop 306 to the edge print circuit to tell it whether the first and third or second and fourth digits are to be printed (most significant or least significant digit of a group of two digits). This information is used by the edge print circuit to activate the minor offset circuit in the analog amplifier.

Referring to FIG. 6, the print head comprises an array of 20 semiconductor elements arranged in five rows and four columns. These elements are pressed against the paper and the elements are selectively heated to form the desired alpha-numeric character upon the heat sensitive paper. The logics described in FIG. 5 are used to selectively heat individual elements in the print head matrix. For a typical print, which consists of a FIG. 8, first row 1 would be selected and columns 1, 2, 3, and 4 would be activated. Next row 2 would be selected and columns 1 and 4 would be activated. Then row 3 would be selected and all columns would be activated. Then row 4 would be selected and columns 1 and 4 would be activated. Finally row 5 would be selected and all columns activated. This completes the printing of the number 8 and the head may be removed from the paper. If a dot is to be printed instead of or along with the point identification number, then column 3 is activated whenever row 2 is selected.

The recorder has the capability of printing a dot and number for the point identification, a dot only showing the analog value, or the recorder may operate in the Identaline mode. The print pattern-switch controls which pattern is to be printed. To print a dot, line 353 of FIG. 5a is grounded. The signal is inverted by 354 and applied to 224. This causes the dot to be printed during the print cycle. If 251 and 247 of FIG. 5a are both at a logic 1, then the point identification number will be printed. If 251 is grounded, 247 is a logic 1 and 353 is grounded, then only the dot will be printed. In the Identaline mode the control of lines 251 and 353 is transferred to the Identaline card. This card contains counter and comparison circuits which cause the printing of a dot for a point most of the time but periodically cause the print of the point identification number instead of the dot.

The Identaline pattern is determined by logic circuits on this card. For slowly varying signals this gives a pattern of dots which form a trace with the point's identification printed periodically along it. The Identaline counters are advanced by signals coming from line 315 of FIG. 5c. One pulse is generated for each 24 points counted. If in the normal operating mode, and one pulse for each print cycle in the point- hold mode.

The printing of individual point identifications is controlled so that the point identification numbers are printed in numerical sequence and spaced equally in time sequence. The ratio of identification number to dot can be selected by a switch and is typically one in 24, one in 48, or one in 96. By proper selection of print rate, Identaline ratio, and chart speed, traces may be obtained which contain many prints in the form of dots instead of numbers to save paper and yet with the identification numbers so spaced that one number will not print on top of another.

While there have been described above the principles of this invention in connection with specific apparatus, it is to be clearly understood that this description is made only by way of example and not as a limitation in the scope of the invention.

What is claimed is:

1. A graph printing apparatus comprising:
a chassis;
a print head moveably mounted on the chassis and having an array of selectively activatable elements;
drive means for advancing a strip of markable recording medium past and adjacent to the array of elements of the print head;
activation means for selectively activating elements of the array to mark the advancing medium in response to marking commands;
analog means for positioning the print head along a direction transverse to the direction of advance of the medium in response to a data input to the apparatus;
means for generating an alpha-numeric character marking command and an alternative point marking command and for coupling one of said commands to the activation means; and
offset means for positioning the print head a preset distance, along a direction transverse to the direction of advance of the medium, from a first position during printing of certain characters of multi-character alpha-numeric markings on the strip of markable recording medium.

2. The apparatus of claim 1 in which the offset means is operable to position the print head a preset distance from a first position which is determined by the analog means.

3. The apparatus of claim 1 in which the offset means is operable to position the print head a preset distance from a first position which is fixed relative to the chassis.

4. The apparatus of claim 3 in which the offset means is operable to position the print head a preset distance from a first position which is determined by the analog means.

5. The apparatus of claim 1 in which the means for generating comprises digital logic circuitry.

6. The apparatus of claim 1 in which the print head in a thermal print head having an array of selectively heatable elements, and the analog means comprises a servo motor responsive to relative values of input data and operable to position the print head in response to said relative values of data.

7. The apparatus of claim 1 which further comprises multiplexing means for sequentially supplying several channels of data to the analog means, said multiplexer means including means for coordinating the character, generated by the means for generating an alphanumeric character marking command, with the channel of data being supplied to the analog means.

8. A graph printing apparatus comprising:
a chassis;
a thermal printhead moveably mounted on the chassis and having an array of selectively heatable elements;
drive means for advancing a strip of heat sensitive recording medium past and adjacent to the array of elements of the print head;
activation means for selectively heating elements of the array of elements to mark the advancing medium in response to marking commands;
analog means for positioning the print head along a direction transverse to the direction of advance of the medium in response to data inputs to the apparatus;
means for generating a point marking command and for coupling said command to the activation means when the analog means has positioned the print head in response to a data input to the apparatus;
input selector switch means for sequentially coupling each input of a plurality of data inputs to the analog means, the input selector switch means advancing to a succeeding data channel after a print operation;
first logic means for generating at an output an alphanumeric character signal uniquely representative of each channel of input data;
means for generating an alphanumeric character marking command corresponding to the output of said first logic means and for coupling said alphanumeric character marking command to the activation means, when the analog means has positioned the print head in response to a data input, at preset intervals;
offset means for positioning the print head preset distance, along a direction transverse to the direction of advance of the medium, from the data-responsive position of the print head during printing of a second character of a two-character alphanumeric channel marking on the strip of heat sensitive recording medium.

9. The apparatus of claim 8 which further comprises edge print offset means for rendering the analog means nonresponsive to data inputs and for positioning the print head at a first preset position along a direction transverse to the direction of advance of the medium;
generator means for sequentially generating a plurality of alphanumeric character marking commands and for sequentially coupling each of said commands to the activation means;
minor offset means for sequentially positioning the print head preset distances, along a direction transverse to the direction of the advance of the medium, from the first preset position during printing of each character of the multi-character alphanumeric marking on the strip of heat sensitive medium, an offset being provided for each character after the first character of the multi-character alphanumeric symbol.

10. The apparatus of claim 9 in which the multicharacter alphanumeric symbol contains four characters.

11. The apparatus of claim 10 in which the print head is a thermal print head having an array of selectively heatable elements, and the analog means comprises a servo motor responsive to relative values of input data and operable to position the print head in response to said relative values of data.

12. The apparatus of claim 11 which further comprise:
first means for generating a four character time symbol;
second means for storing a four character graph identification symbol; and
means for selectively coupling the symbol of one of the first and second means to the generator means, the generator means producing a plurality of marking commands corresponding to said symbol.

13. The apparatus of claim 12 which further comprises means for selectively stopping the drive means for advancing the recording medium during the sequential positioning of the print head by the minor offset means.

* * * * *